Feb. 2, 1960  J. BERNATH  2,923,828
SELF-SUPPORTED ELECTRODE STRUCTURE AND METHOD OF MAKING SAME
Filed Nov. 1, 1957

INVENTOR.
JOHN BERNATH
BY Roderick Malcolm
ATTORNEY

United States Patent Office 2,923,828
Patented Feb. 2, 1960

2,923,828

SELF-SUPPORTED ELECTRODE STRUCTURE AND METHOD OF MAKING SAME

John Bernath, Princeton, N.J., assignor to Radio Corporation of America, a corporation of Delaware Application November 1, 1957, Serial No. 693,862

18 Claims. (Cl. 250—211)

This invention relates to electrode structures and particularly to an improved self-supported electrode structure and to a novel method of making a self-supported electrode structure.

In many structures, e.g. in photocells and electroluminescent devices, it is desirable to provide a self-supported electrode structure which is capable of supporting a large multiplicity of elemental volumes of a material such as a photo-conductive material. For purposes of high sensitivity in devices of this type, the volumes must have a high degree of uniformity of size and extremely accurate spacings between volumes. Prior to this invention, there have been various structures available which provide an electrode and a plurality of volumes for receiving material. These structures have proved to be quite expensive, and difficult to construct with the required uniformity and accuracy. Furthermore, prior to this time these structures have been made of glass, which has made it impossible to produce the self-supported electrodes with a sufficiently great number of volumes per unit of area so that the self-supported electrode can be useful in devices such as electroluminescent devices.

It is therefore an object of this invention to provide a new self-supported electrode structure and a novel method of making the same.

It is another object of this invention to provide a novel photoconductive device.

It is a further object of this invention to provide a new and improved photocell.

These and other objects are accomplished in accordance with this invention by providing one or more electrodes embedded below the surface of a plastic with volumes between the electrode surface and the surface of the plastic remaining open to receive a material such as a photoconductive material. The novel method of manufacturing the electrode structure includes compression molding the electrode into the plastic material.

The invention will be more clearly understood by reference to the accompanying single sheet of drawings wherein.

Figure 1:
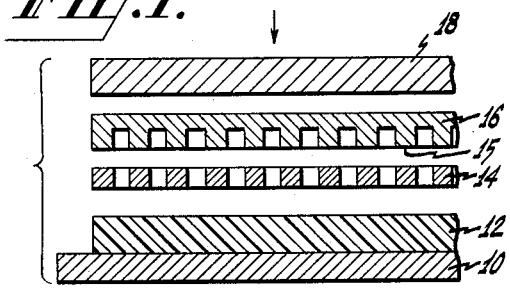
Fig. 1 is an exploded view of the construction of a device in accordance with this invention.

Referring specifically now to Fig. 1, there is shown an exploded view of the method of and means for manufacturing a self-supporting electrode structure in accordance with this invention. The means includes a support member 10, which may be of any known material that is fairly rigid and is a good thermal conductor such as steel. On the support member 10 is a block of plastic 12, which may be formed of any plastic material that is capable of being extruded under pressure. For convenience in manufacturing, a thermo-plastic material can be used. One example of a suitable material for the plastic member 12, which is a thermo-plastic material, is polystyrene. Arranged above the plastic member 12 is a fine mesh screen electrode 14 which may be of any known material such as copper or nickel. The mesh screen electrode 14 may have any desired size and number of wires or elements, and meshes having over 1600 elements per square inch have been found to be useful for certain structures. Arranged above the mesh screen electrode 14 is a die 16 which may be of any known material such as steel. The die 16, in this embodiment, is made to conform to the mesh screen 14 with the extended portions 15 of the die in registration with the wires of the mesh screen 14. The die may be formed either by machining or electroforming. Arranged above the die member 16 is a plate 18 for the purpose of pressing the die 16. It should be noted that the extended portions 15 of the die 16 are registered with the wires or elements of the mesh screen 14. As shown, the depressions in the die 16 extend through only a part of the die 16. However, it should be understood that a die having apertures extending completely through the die could be used and the plate 18 would determine the depth that the mesh is pressed into the plastic.

In accordance with this invention, the plate 18 is pressed downwardly to press the die member 16 against the mesh screen 14. The mesh screen 14 is in turn pressed against the plastic member 12. At this time, heat is applied to the plastic member 12, assuming the use of a thermo-setting plastic, by any known means such as heating the thermally conducted support member 10 or by heating the entire assembly, until the plastic member 12 reaches a state which is at least soft enough to permit a small degree of extrusion of the plastic 12. The extrusion of the plastic member 12 permits the die 16 to force the mesh screen 14 into the plastic member 12 and below the surface thereof. Due to the fact that the extended portions 15 of the die 16 are in alignment with the wires of the mesh screen member 14, the plastic member 12 remains upright in those areas of the plastic 12 between the wires of the mesh screen 14 and the extended portions 15 whereby the plastic does not tend to bend over even though the plastic is soft.

As an example of the method of manufacturing the novel electrode structure in accordance with this invention; when using a block of polystyrene plastic approximately three inches square, a pressure of twenty tons is sufficient to press a copper mesh of 1600 wires per inch into the plastic member 12 to a depth of approximately .020 inch when the lastic member is heated to approximately 310° F.

When the mesh screen 14 has been pressed into the plastic member 12 a sufficient distance, the heating of the material is stopped and the plastic is permitted to set or harden before the die 16 is removed. Thus, as a result of the above steps, a member is formed that has a plurality of pedestals of plastic material between the wires of the mesh screen 14 which is embedded in and beneath the surface of the plastic. It should be understood that other compression molding techniques may be used in accordance with this invention, such as the injection molding method. In the last named method, the wire mesh 14 is positioned between two dies having the desired form, one of which has areas in contact with a mesh screen, and liquid plastic is forced between the dies and allowed to harden.

Figure 3:
Fig. 3 is a sectional view of an embodiment of this invention.

Fig. 3 is a sectional view of an embodiment of a self-supported electrode structure in accordance with this invention wherein the repetition rate of the mesh screen spacings and hole sizes of a conductive mesh 17 is different from the repetition rate of the crenelations in the die so that the mesh screen 17 is embedded beneath some of the pedestals of plastic 19 and is exposed between other pedestals of plastic 19. This structure may be made with the materials and methods previously described except that it is no longer necessary to have the pedestals of the die in registration with the wires of the mesh screen.

After the mesh 14 has been embedded in the plastic member, with the pedestals of plastic extending beyond the mesh screen, the grooves of the crenelated plastic structure can be filled with a photoconductive or other suitable material. The photoconductive material 20 may be any known material and the plastic bonded powdered form has been found to be convenient since it can be settled or spread into the volumes between pedestals of plastic and in contact with the embedded mesh screen.

Figure 4:
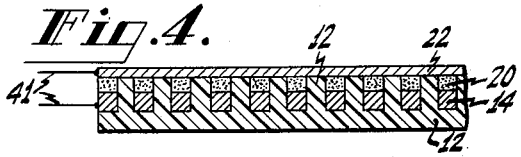
Fig. 4 is a sectional view of a photocell in accordance with this invention and taken along line 4—4 of Fig. 5.

When the photoconductive material 20 is placed in the grooves of the plastic insulating member 12, and onto the wire mesh electrode 14, the device may be put to several uses. As an example, a photocell may be constructed by depositing a conductor 22 on the pedestals of insulating material and on the exposed areas of the photoconductor 20, as shown in Fig. 4. The conductor 22 may be transparent or opaque, assuming that the plastic and the mesh screen are substantially transparent, and may be of a material such as evaporated gold. Thus, a photocell is formed having conductors 14 and 22, with elemental areas of photoconductive material 20 therebetween. The conductors, comprising the mesh screen 14 and the conductive coating 22, may be energized by suitable lead-ins 41 as shown. Suitable photoconductors for the photocell structure is a powdered form of cadmium sulphide or a powdered form of cadmium selenide. The lead-ins 41 may be joined to the conductors 14 and 22 by any conventional means such as silver paste. The entire photocell may be placed in a container, e.g. an envelope (not shown), and the container evacuated to approximately $10^{-4}$ mm. of Hg and baked to approximately 80° C.

Figure 6:
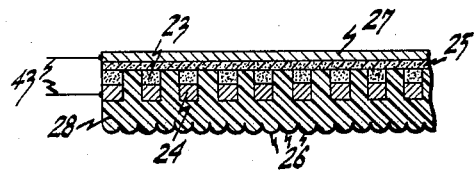
Fig. 6 is a sectional view, taken along section line 6—6 of Fig. 7, of an electroluminescent device in accordance with this invention.
Figure 2:
Fig. 2 is a sectional view of a device in accordance with this invention.
Figure 7:
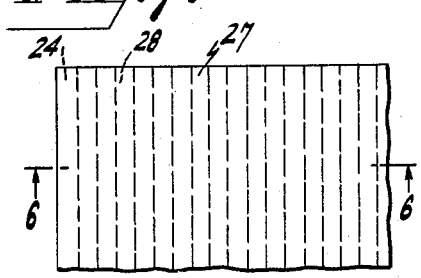
Fig. 7 is a plan view of the electroluminescent device shown in Fig. 6.

An electroluminescent device, such as that shown in Figs. 6 and 7, may be made from a structure similar to that shown in Fig. 2 by filling the spaces between the pedestals of plastic member 28 and on a conductor 24 with a photoconductor 23, e.g. cadmium sulphide. Then, an electroluminescent phosphor 25, e.g. zinc selenide, or zinc sulphide, is deposited on the pedestals of plastic insulating material 28 and on the exposed surface of the photoconductive material 23. Subsequently, a transparent conductive electrode 27 is deposited on the electroluminescent phosphor to provide a continuous circuit between the mesh screen 14 and the conductor 27. Potentials may be applied to this circuit by means of lead-ins 43 which may connect one or more of the conductors 24.

It should be noted that the electroluminescent device includes isolated strips of conductive materials 24 embedded in the plastic in place of the mesh screen electrode shown previously. For the manufacture of this structure, a die having a plurality of grooves is used with each of the protuberances of the die in registry with a different one of the conductive wires 24. It should be understood that the grooves in the die may occur at a different frequency than the wires or conductive strips 24. Also, the grooves in the die may be arranged parallel to or at an angle with respect to the wires 24.

A feature shown in Fig. 6 is that the bottom of the plastic member 28 is formed as a lenticular optical lens system 26 of cylindrical or spherical lenses to concentrate light onto the photoconductor 23 or onto the walls of plastic member 28 which surrounds the photoconductor. This may be done by using a base member having the desired configuration in registration with the die used to press the wires 24 into the plastic 28.

Figure 8:
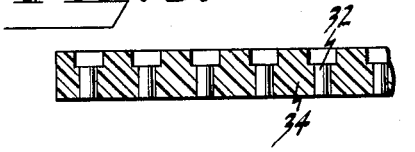
Fig. 8 is a sectional view, taken along sectional line 8—8 of Fig. 9, of an embodiment of this invention.
Figure 5:
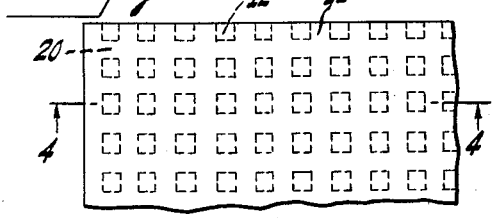
Fig. 5 is a plan view of the photocell shown in Fig. 4 and in accordance with this invention.
Figure 9:
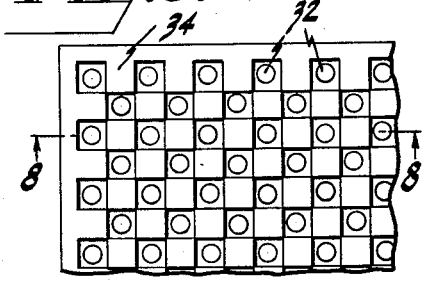
Fig. 9 is a plan view of Fig. 8.

Figs. 8 and 9 are a sectional and a plan view of an embodiment of this invention, in which isolated conductive elements 32 are embedded within a plastic insulating material 34. The conductive elements 32 are arranged so that the elements 32 are embedded beneath one surface of the plastic and are exposed on the opposite side of the plastic 34 so that electrical connection can be made to each of the conductive elements on the opposite side of the plastic.

The structure shown in Figs. 8 and 9 is formed by using a die having means to position the plurality of conductors 32 and to retain the plastic 34 in its proper orientation. In this embodiment, the spaces in the plastic and between the conductors and the surface of the plastic may be filled with photoconductive material as described.

The plastic material, for any of the embodiments described, may be any electrically insulating material, e.g. polystyrene, or may be electrically conductive, e.g. polystyrene powder mixed with flakes of silver. The plastic may be selected for its dielectric constant and resistivity depending upon the end use of the product. Also, the plastic material may be opaque, e.g. polystyrene impregnated with carbon black or darkened with dye, when it is desirable to prevent optical coupling between adjacent elemental areas of the device produced. Still further, the plastic may be light transparent, e.g. polystyrene, when it is desired to excite the elemental areas of the photocell through the plastic.

The die, or dies, are preferably of a material which is not wetted by the plastic material so that no adhesion between these members occurs during the mold release process.

It should be understood that the plastic material, in all embodiments of this invention, may be light translucent, e.g. polyethylene, which will produce better light excitation of the photoconductor by diffusion of the incident light between plastic pedestals by illuminating the walls of the pedestals. Also, it should be understood that, when desired, the plastic may be made opaque to visible light, and a photoconductor selected that responds to invisible radiations, such as X-rays, and the device can be used for measuring or observing the invisible radiation. Furthermore, it should be understood that the plastic member may have one or more electrodes inserted below one or more surfaces when desired.

The size of the total area of devices may be as large as is desired, and the large areas may subsequently be cut into smaller areas when desired. Thus, this invention has described a novel method of forming a new and improved self-supporting electrode structure wherein the elements are accurately and uniformly spaced from each other. Also, the number of pedestals per inch may be any desired number. For example, devices having over 1600 pedestals per inch, with a height of approximately 0.020 inch, have been made with the spacing between pedestals controlled very accurately. When compared to the practical limit for glass structures of this type, which is approximately 500 pedestals per inch, and which would cost over 100 times as much per inch, the usefulness of this invention is readily appreciated.

What is claimed is:

1. An electrode structure comprising a plastic member, a conductor embedded in said plastic member and removed from one surface of said plastic, and uniformly spaced indentations in said plastic member extending from said one surface to said conductor.

2. A self-supporting electrode structure comprising a plastic member having two faces, a conductor embedded in said member and between said faces, a plurality of uniformly spaced similar apertures in said member and extending from one of said faces to said conductor.

3. An electrode structure comprising a plastic member, a wire mesh screen electrode embedded in said plastic member and removed from one surface of said plastic member, and a plurality of uniformly spaced similar indentations in said plastic member and extending from said one surface to said mesh screen electrode.

4. An electrode structure comprising a substantially planar plastic member having front and back surfaces, a wire mesh screen embedded in said member and substantially removed from said surfaces, and a plurality of uniformly spaced similar indentations in said member, said indentations extending from one of said surfaces to said mesh screen.

5. An electrode structure as in claim 4 wherein said indentations in said plastic are registered with the wires in said wire mesh electrode.

6. An electrode structure as in claim 4 wherein the number of said indentations is different from the number of the wires in said wire mesh electrode.

7. An electrode structure comprising an electrically insulating material, electrode means within said material and removed from one surface of said material, and a plurality of uniformly spaced similar apertures in said insulating material and extending from said surface to said electrode means.

8. An electrode structure as in claim 7 wherein said electrode means comprises a plurality of substantially parallel wires.

9. An electrode structure as in claim 7 wherein said electrode means comprises a plurality of conductive plugs.

10. A photocell comprising a plastic member having front and back surfaces, a wire mesh electrode embedded in said member and between said surfaces, a plurality of indentations in said member and extending from one of said surfaces to said mesh electrode, photoconductive material filling said indentations, and a conductor covering said surface and contacting said photoconductor.

11. An electroluminescent device comprising a plastic member having at least two surfaces, an electrode embedded in said member and between said surfaces, a plurality of indentations in said member and extending from one of said surfaces to said electrode, a photoconductive means filling said indentations and in contact with said electrode, an electroluminescent phosphor on said surface and in contact with the photoconductor in said indentations, and a conductor on said electroluminescent phosphor.

12. The method of manufacturing a self-supporting electrode structure comprising compression molding a mesh electrode into a plastic.

13. The method of manufacturing a self-supporting electrode structure of the type including a mesh electrode embedded in a plastic, said method comprising the steps of compression molding said mesh electrode into said plastic while maintaining apertures from a surface of said plastic to said electrode.

14. The method of manufacturing a self-supporting electrode structure of the type including a mesh electrode embedded in a plastic, said method comprising the steps of pressing said mesh electrode below a surface of said plastic, and maintaining apertures in said plastic from said surface to said electrode.

15. The method of manufacturing a photoconductive device comprising the steps of pressing a conductor into a plastic and beneath the surface of said plastic, providing apertures in said plastic from said surface to said conductor, and filling said apertures with photoconductive material.

16. The method of manufacturing a self-supporting electrode structure of the type including a plastic member having front and back surfaces, said method comprising the steps of compression molding an electrode into said member and between said surfaces, compression molding a plurality of indentations in said member and between one of said surfaces and said electrode, and compression molding a lenticular lens system in the other of said surfaces.

17. The method of manufacturing a self-supporting electrode structure of the type including a thermo-setting plastic, said method comprising the steps of compression molding a mesh screen electrode having a predetermined number of wires per inch into said plastic, and simultaneously compression molding a number of indentations into said plastic extending from a surface of said plastic to said mesh screen electrode with said number of indentations being different from said predetermined number.

18. The method of manufacturing a self-supporting electrode structure of the type including a thermo-setting plastic having front and back surfaces, said method comprising the steps of placing a mesh electrode against one of surfaces, heating said plastic and pressing said electrode beneath said one of said surfaces, and hardening said plastic while preserving a free space between said electrode and said one of said surfaces.

References Cited in the file of this patent

UNITED STATES PATENTS

| | | |
|---|---|---|
| 2,540,490 | Rittner | Feb. 6, 1951 |
| 2,573,200 | Hushley | Oct. 20, 1951 |
| 2,649,513 | Luhn | Aug. 18, 1953 |
| 2,837,660 | Orthuber et al. | June 3, 1958 |